US012785216B2

(12) United States Patent
Zhang et al.

(10) Patent No.: US 12,785,216 B2
(45) Date of Patent: Nov. 3, 2026

(54) LAYERED POROUS FILM, SECONDARY BATTERY, AND ELECTRONIC APPARATUS

(71) Applicant: Ningde Amperex Technology Limited, Ningde City (CN)

(72) Inventors: Long Zhang, Ningde City (CN); Dongyang Guo, Ningde City (CN)

(73) Assignee: NINGDE AMPEREX TECHNOLOGY LIMITED, Ningde City (CN)

(*) Notice: Subject to any disclaimer, the term of this patent is extended or adjusted under 35 U.S.C. 154(b) by 607 days.

(21) Appl. No.: 18/227,356

(22) Filed: Jul. 28, 2023

(65) Prior Publication Data

US 2023/0369721 A1 Nov. 16, 2023

Related U.S. Application Data

(63) Continuation of application No. PCT/CN2021/074095, filed on Jan. 28, 2021.

(51) Int. Cl.

*H01M 50/489* (2021.01)
*H01M 10/42* (2006.01)
*H01M 50/417* (2021.01)
*H01M 50/42* (2021.01)
*H01M 50/449* (2021.01)

(52) U.S. Cl.

CPC ..... *H01M 50/489* (2021.01); *H01M 10/4235* (2013.01); *H01M 50/417* (2021.01); *H01M 50/42* (2021.01); *H01M 50/449* (2021.01)

(58) Field of Classification Search

CPC ............ H01M 50/489; H01M 50/417; H01M 50/449; H01M 50/42; H01M 10/4235
See application file for complete search history.

(56) References Cited

U.S. PATENT DOCUMENTS

| | | | | |
|---|---|---|---|---|
| 4,359,510 | A | 11/1982 | Taskier | |
| 9,960,400 | B2 | 5/2018 | Bae et al. | |
| 2013/0017430 | A1* | 1/2013 | Terakawa ............ | H01M 50/489 428/335 |

FOREIGN PATENT DOCUMENTS

| | | | |
|---|---|---|---|
| CN | 102171856 | A | 8/2011 |
| CN | 103261294 | A | 8/2013 |

(Continued)

OTHER PUBLICATIONS

JP2017094709 translation (Year: 2017).*

(Continued)

*Primary Examiner* — Jane J Rhee
(74) *Attorney, Agent, or Firm* — WHDA, LLP

(57) ABSTRACT

A layered porous film includes a substrate film and a polymer coating provided on at least one side of the substrate film. The substrate film and the polymer coating satisfy both formula I and formula II: $0 \leq (Tm_1 - Tm_2)/M_1 \leq 0.0005$, formula I, and $0 \leq (Tm_1 - Tm_2)/M_2 \leq 0.05$, formula II; where $Tm_1$ is a melting point of the substrate film, and $M_1$ is a weight-average molecular weight of a polymer contained in the substrate film; and $Tm_2$ is a melting point of the polymer coating, and $M_2$ is a weight-average molecular weight of a polymer contained in the polymer coating. The layered porous film has advantages of low pore-closing temperature and high inflection resistance.

20 Claims, 2 Drawing Sheets

(56) References Cited

FOREIGN PATENT DOCUMENTS

| | | | |
|---|---|---|---|
| CN | 103390741 | A | 11/2013 |
| CN | 106684299 | A | 5/2017 |
| CN | 108039439 | A | 5/2018 |
| CN | 109786620 | A | 5/2019 |
| CN | 109786636 | A | 5/2019 |
| CN | 109935770 | A | 6/2019 |
| CN | 110021729 | A | 7/2019 |
| CN | 111785893 | A | 10/2020 |
| EP | 3683860 | A1 | 7/2020 |
| JP | 2015221889 | A | 12/2015 |

OTHER PUBLICATIONS

Extended (Supplementary) European Search Report dated Mar. 26, 2025, issued in counterpart EP Application No. 21921782.5. (5 pages).

Office Action dated Aug. 19, 2025, issued in counterpart CN Application No. 202180091608.8. (10 pages).

International Search Report dated Apr. 14, 2021, issued in counterpart International Application No. PCT/CN2021/074095, with English Translation. (7 pages).

Decision of Refusal dated Feb. 15, 2026, issued in counterpart CN Application No. 202180091608.8. (61 pages).

China Encyclopedia of Chemistry, Beijing China Encyclopedia Publishing House, 1989, with partial English translation. (57 pages); cited in CN Decision of Refusal dated Feb. 15, 2026.

* cited by examiner

LAYERED POROUS FILM, SECONDARY BATTERY, AND ELECTRONIC APPARATUS

CROSS REFERENCE TO THE RELATED APPLICATIONS

This application is a continuation under 35 U.S.C. § 120 of international patent application PCT/CN2021/074095 filed on Jan. 28, 2021, the entire content of which is incorporated herein by reference.

TECHNICAL FIELD

This application relates to the field of energy storage and specifically to a layered porous film, a secondary battery, and an electronic apparatus.

BACKGROUND

With the development of electric vehicles and energy storage industries, increasingly high requirements are imposed on secondary batteries, requiring secondary batteries to have better safety and higher energy density. A secondary lithium-ion battery is mainly formed by a positive electrode, a negative electrode, an electrolyte, and a battery separator. The separator is located between the positive electrode and the negative electrode to prevent passage of electrons so as to prevent a short circuit caused by contact between the positive electrode and the negative electrode. In addition, the separator allows passage of electrolyte ions to produce current. In terms of safety of lithium batteries, pore-closing temperature and rupture temperature of separators are primary indicators to be considered for ensuring safety.

A separator is typically provided with microporous structures for passage of electrolyte ions. When a battery undergoes an abnormal reaction, an intense chemical reaction occurs inside the battery, and a large amount of joule heat is generated. When the internal temperature of the battery reaches the pore-closing temperature of the separator, the separator contracts its pores to block passage of lithium ions, terminating the chemical reaction inside the battery, and thereby avoiding further thermal runaway, for example, explosion. A lithium-ion battery is used as an example. A normal operating temperature of the lithium-ion battery is 0° C.-60° C. However, existing separators have a relatively high pore-closing temperature. When the temperature of the lithium-ion battery goes out of control and reaches a pore-closing temperature of a separator, abnormalities or damages have already been caused to other components, resulting in certain losses. To further improve safety performance of lithium-ion batteries, separators with a lower pore-closing temperature are required.

In an existing manufacture process of separators, materials with low melting point are typically added to make separators have a lower pore-closing temperature. However, due to limitations of separator processing technologies and equipment, materials with low melting point are often restricted to a melting point of 125° C., resulting in a relatively high pore-closing temperature of separators, and leading to failure in further improving safety of battery cells. If materials with lower melting point are used, due to their low melting points and small molecular weights (indicating high melt flow index), melt strength for extrusion is excessively low, making it impossible to process the material into films. As a result, in existing separators, polypropylene is often used as a substrate film, and such substrate film has a relatively high pore-closing temperature. Although the pore-closing temperature can be reduced by applying a pore-closing coating, a pore-closing resistance is low, resulting in poor actual improvement effect on safety of battery cells. In addition, when a mixture of pore-closing coating particles and ceramic is applied onto the substrate film, actual coverage on surface of the substrate film is low, making effective pore closing fail at high temperatures, and thus making it difficult to lower a pore-closing temperature of separators.

SUMMARY

This application is intended to propose a layered porous film in an embodiment, so as to reduce a pore-closing temperature of a separator and increase inflection resistance of the separator.

This application is further intended to propose a secondary battery in an embodiment, so as to improve safety of the secondary battery.

This application is further intended to propose an electronic apparatus in an embodiment, so as to improve safety of the electronic apparatus.

To achieve the above objectives, the following technical solutions are used.

This application relates to a layered porous film including a substrate film and a polymer coating provided on at least one side of the substrate film, where the substrate film and the polymer coating satisfy both formula I and formula II:

$$0 \le (Tm_1 - Tm_2)/M_1 \le 0.0005, \text{ and} \quad \text{formula I}$$

$$0 \le (Tm_1 - Tm_2)/M_2 \le 0.05; \quad \text{formula II}$$

where $Tm_1$ is a melting point of the substrate film in ° C., and $M_1$ is a weight-average molecular weight of a polymer contained in the substrate film; and $Tm_2$ is a melting point of the polymer coating in ° C., and $M_2$ is a weight-average molecular weight of a polymer contained in the polymer coating.

In an embodiment, the layered porous film satisfies at least one of the following characteristics:

the melting point $Tm_1$ of the substrate film satisfies 125° C.$\le Tm_1 \le$140° C.; or the melting point $Tm_2$ of the polymer coating satisfies 90° C.$\le Tm_2 \le Tm_1$.

In an embodiment, the weight-average molecular weight $M_1$ of the polymer contained in the substrate film satisfies $100000 \le M_1 \le 1000000$.

In an embodiment, the weight-average molecular weight $M_2$ of the polymer contained in the polymer coating satisfies $1000 \le M_2 \le 100000$.

In an embodiment, the layered porous film satisfies at least one of the following characteristics:

a thickness of the layered porous film is 5 μm to 30 μm; or a thickness of the polymer coating accounts for 3%-67% of the thickness of the layered porous film.

In an embodiment, the layered porous film satisfies at least one of the following characteristics:

a pore-closing temperature of the substrate film is less than or equal to 135° C.; or an inflection resistance of the layered porous film is greater than or equal to 5 WΩ.

In an embodiment, a material of the substrate film includes at least one of ultra-high molecular weight polyethylene, polypropylene, high-density polyethylene, medium-density polyethylene, low-density polyethylene, linear low-density polyethylene, linear and branched polyethylene, metallocene polyethylene, polyimide, poly(4-methyl-1-pentene), polystyrene, or polyvinylidene fluoride.

In an embodiment, a material of the polymer coating includes at least one of linear and branched polyethylene, polyethylene wax, polymethyl methacrylate, ethylene-acrylic acid copolymer, or ethylene-vinyl acetate copolymer.

An embodiment of this application further provides a secondary battery including a positive electrode, a negative electrode, and the layered porous film described in this application and disposed between the positive electrode and the negative electrode.

An embodiment of this application further provides an electronic apparatus including the secondary battery described in this application.

The beneficial effects that can be achieved using the technical solutions proposed in this application are as follows.

The layered porous film provided in this application includes the substrate film and the polymer coating, and the polymer coating is provided on at least one surface of the substrate film. The melting point $Tm_1$ of the substrate film, the weight-average molecular weight $M_1$ of the polymer contained in the substrate film, the melting point $Tm_2$ of the polymer coating, and the weight-average molecular weight $M_2$ of the polymer contained in the polymer coating satisfy $0 \le (Tm_1 - Tm_2)/M_1 \le 0.0005$ and $0 \le (Tm_1 - Tm_2)/M_2 \le 0.05$. The polymer coating can close its pores at low temperatures while maintaining high resistance, and when the internal temperature of a battery rises to some extent, the polymer coating undergoes melt flow to close ion channels of the substrate film, thereby better improving safety of battery cells under such synergistic effect. In addition, when used as a battery separator, performance of the layered porous film can satisfy processing requirements for separator.

The following further describes this application with reference to specific embodiments. It should be understood that these specific embodiments are merely intended to illustrate this application but not to limit the scope of this application. The formulations, proportions, and the like in these embodiments can be selected as appropriate without substantially affecting the results.

Figure 1:
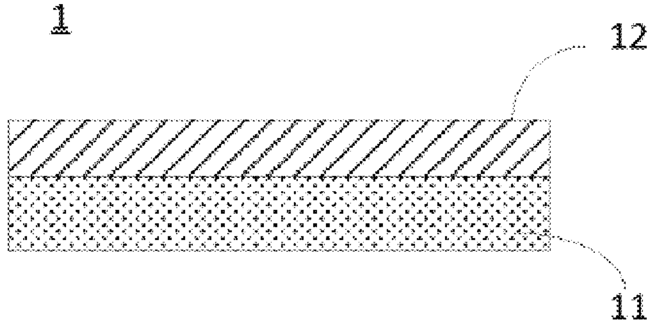
FIG. 1 is a schematic structural diagram of a layered porous film according to a first embodiment of this application.

Reference signs: 1. layered porous film; 11. substrate film; and 12. polymer coating.

DETAILED DESCRIPTION

The following describes in detail a layered porous film, a secondary battery, and an electronic apparatus according to this application.

An embodiment of this application relates to a layered porous film including a substrate film and a polymer coating provided on at least one side of the substrate film, where the substrate film and the polymer coating satisfy both formula I and formula II:

$$0 \le (Tm_1 - Tm_2)/M_1 \le 0.0005, \text{ and} \quad \text{formula I}$$

$$0 \le (Tm_1 - Tm_2)/M_2 \le 0.05; \quad \text{formula II}$$

where $Tm_1$ is a melting point of the substrate film in ° C., and $M_1$ is a weight-average molecular weight of a polymer contained in the substrate film; and $Tm_2$ is a melting point of the polymer coating in ° C., and $M_2$ is a weight-average molecular weight of a polymer contained in the polymer coating.

It can be understood that the polymer coating may be provided on one surface or two surfaces of the substrate film.

The layered porous film provided in this embodiment of this application includes the substrate film and the polymer coating, and the polymer coating is provided on at least one surface of the substrate film. When the melting point $Tm_1$ of the substrate film, the weight-average molecular weight $M_1$ of the polymer contained in the substrate film, the melting point $Tm_2$ of the polymer coating, and the weight-average molecular weight $M_2$ of the polymer contained in the polymer coating satisfy $0 \le (Tm_1 - Tm_2)/M_1 \le 0.0005$ and $0 \le (Tm_1 - Tm_2)/M_2 \le 0.05$, the polymer coating can close its pores at low temperatures while maintaining high resistance, thereby better improving safety of battery cells. When the internal temperature of a battery rises to some extent, the polymer coating undergoes melt flow to close ion channels of the substrate film.

When the melting points and weight-average molecular weights of the substrate film and polymer coating satisfy $0 \le (Tm_1 - Tm_2)/M_1 \le 0.0005$ and $0 \le (Tm_1 - Tm_2)/M_2 \le 0.05$, the substrate film can flow to close its pores at low temperatures while maintaining suitable melt strength for casting, satisfying processing requirements, and the polymer coating can also flow to close its pores at low temperatures, thereby better improving safety of battery cells under such synergistic effect.

When $(Tm_1 - Tm_2)/M_1 < 0$, indicating $Tm_1 < Tm_2$, the melting point of the polymer coating is higher than the melting point of the substrate film, featuring no practical application value. When $(Tm_1 - Tm_2)/M_1 > 0.0005$, under a condition of a specified difference in melting point between the substrate film and the polymer coating, excessively small molecular weight of the substrate film leads to excessively poor melt strength for casting of the layered porous film, leading to failure in normal film formation, and thus resulting in poor appearance, uneven thickness, and the like of the layered porous film.

When $(Tm_1 - Tm_2)/M_2 < 0$, indicating $Tm_1 < Tm_2$, the melting point of the polymer coating is higher than the melting point of the substrate film, featuring no practical application value. When $(Tm_1 - Tm_2)/M_2 > 0.05$, under a condition of a specified difference in melting point between the substrate film and the polymer coating, excessively small molecular weight of the polymer leads to so excessively high fluidity of the polymer coating at high temperatures that the polymer coating flows like a "liquid", leading to failure in film formation; and the polymer coating cannot close its pores, leading to weakened interaction effect and failure in better improving safety of battery cells.

Therefore, for the layered porous film provided in this application, the relationships between melting point and molecular weight of the substrate film and polymer coating are innovatively revealed, and two relational expressions are innovatively constructed. Combination of melting point and molecular weight of the substrate film and polymer coating enables the layered porous film to close its pores at low temperatures while maintaining high resistance, thereby better improving safety of battery cells under such synergistic effect. In addition, when used as a battery separator, performance of the layered porous film can satisfy processing requirements for separators.

The substrate film may be a single-layer film structure or a multi-layer film structure.

FIG. 1 is a schematic structural diagram of a layered porous film according to an embodiment of this application. As shown in FIG. 1, in this embodiment of this application, a substrate film 11 of the layered porous film 1 is a single-layer film structure, with a polymer coating 12 provided on one surface of the substrate film 11.

Figure 2:
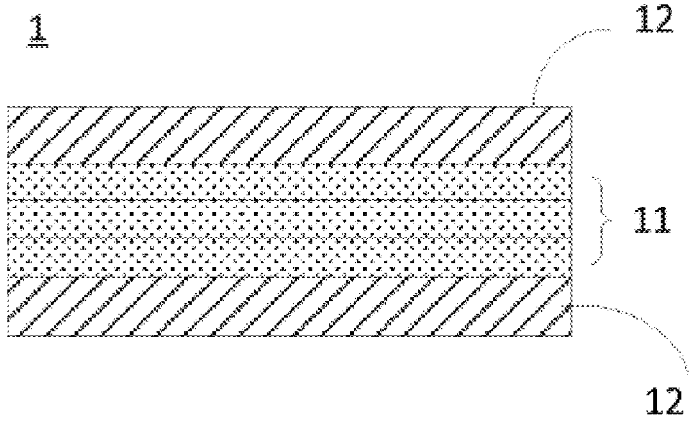
FIG. 2 is a schematic structural diagram of a layered porous film according to a second embodiment of this application.

FIG. 2 is a schematic structural diagram of a layered porous film according to another embodiment of this application. As shown in FIG. 2, in this embodiment of this application, a substrate film 11 of the layered porous film 1 is a three-layer film structure, with polymer coatings 12 provided on two sides of the substrate film 11.

The number of layers of the substrate film may be two, three, four, or the like, which is not specifically limited herein and may be set based on actual performance of secondary batteries.

A lower limit of $(Tm_1-Tm_2)/M_1$, typically but not limitedly, may be, for example, 0, 0.00001, 0.00002, 0.00003, 0.00004, 0.00005, 0.00006, 0.00007, 0.00008, 0.00009, or 0.0001; and an upper limit of $(Tm_1-Tm_2)/M_1$, typically but not limitedly, may be, for example, 0.0005, 0.00048, 0.00047, 0.00045, 0.00044, 0.00043, 0.00042, 0.0004, 0.00038, 0.00035, 0.00032, or 0.0003.

A lower limit of $(Tm_1-Tm_2)/M_2$, typically but not limitedly, may be, for example, 0, 0.001, 0.001, 0.002, 0.003, 0.004, 0.005, 0.006, 0.007, 0.008, 0.009, 0.01, 0.011, 0.012, 0.013, 0.014, or 0.015; and an upper limit of $(Tm_1-Tm_2)/M_2$, typically but not limitedly, may be, for example, 0.05, 0.049, 0.048, 0.047, 0.046, 0.045, 0.044, 0.043, 0.042, 0.041, 0.04, 0.039, 0.038, 0.037, 0.036, 0.035, 0.034, 0.033, 0.032, 0.031, or 0.03.

In an embodiment of this application, a material of the substrate film includes but is not limited to at least one of ultra-high molecular weight polyethylene, polypropylene, high-density polyethylene, medium-density polyethylene, low-density polyethylene, linear low-density polyethylene, linear and branched polyethylene, metallocene polyethylene, polyimide, poly(4-methyl-1-pentene), polystyrene, or polyvinylidene fluoride.

In an embodiment of this application, a material of the polymer coating includes but is not limited to at least one of linear and branched polyethylene, polyethylene wax, polymethyl methacrylate, ethylene-acrylic acid copolymer, or ethylene-vinyl acetate copolymer.

In an embodiment of this application, the layered porous film satisfies at least one of the following characteristics: the melting point $Tm_1$ of the substrate film satisfies 125° C.≤$Tm_1$≤140° C.; or the melting point $Tm_2$ of the polymer coating satisfies 90° C.≤$Tm_2$≤$Tm_1$.

Optimized melting point of the substrate film allows pore-closing performance in lower temperatures of the substrate film. Optimized melting point of the polymer coating allows lower pore-closing temperature of the layered porous film as well as higher resistance of the layered porous film. When used as a separator, the layered porous film can significantly improve safety of secondary batteries.

The melting point $Tm_1$ of the substrate film may be, for example, 125° C., 126° C., 127° C., 128° C., 129° C., 130° C., 131° C., 132° C., 133° C., 134° C., 135° C., 136° C., 137° C., 138° C., 139° C., or 140° C.

In an embodiment of this application, the weight-average molecular weight $M_1$ of the polymer contained in the substrate film satisfies 100000≤$M_1$≤1000000. In an embodiment of this application, the weight-average molecular weight $M_2$ of the polymer contained in the polymer coating satisfies $1000<M_2<100000$.

The value range of the weight-average molecular weight of the polymer in the substrate film being limited can improve the melt strength for casting of the substrate film, facilitating film formation, and allowing for effective control of surface smoothness and more even thickness of the layered porous film.

Optimized value range of the weight-average molecular weight of the polymer in the polymer coating, when temperature rises, allows sufficient fluidity of the polymer coating to implement pore closing of the substrate film, and also effectively prevents the polymer coating from flowing too fast, so that the polymer coating, after the flow occurs, interacts with the substrate film, thereby effectively implement pore closing.

In an embodiment of this application, the layered porous film satisfies at least one of the following characteristics: thickness of the layered porous film is 5 μm to 30 μm; or thickness of the polymer coating accounts for 3%-67% of the thickness of the layered porous film.

Optimized thickness of the layered porous film can further increase the resistance after pore closing, thereby increasing impedance. The thickness of the layered porous film may be, for example, 5 μm, 10 μm, 15 μm, 20 μm, 25 μm, or 30 μm.

The proportion of the polymer coating in the layered porous film in thickness being adjusted can allow sufficient combination of the polymer coating with the substrate film at high temperatures to form a pore-closing structure while significantly improving the resistance of the entire layered porous film. The thickness of the polymer coating accounts for, for example, 3%, 5%, 10%, 15%, 20%, 25%, 30%, 35%, 40%, 45%, 50%, 55%, 60%, 65%, or 67%, of the total thickness of the layered porous film.

In an embodiment of this application, the layered porous film satisfies at least one of the following characteristics: a pore-closing temperature of the substrate film is less than or equal to 135° C.; or an inflection resistance of the layered porous film is greater than or equal to 5 WΩ.

The technical solutions in this embodiment of this application being used can make the pore-closing temperature of the obtained layered porous film be less than or equal to 135° C., and make the inflection resistance of the layered porous film be greater than or equal to 5 WΩ. In this way, when used as a separator of a secondary battery, the layered porous film can significantly improve safety of the secondary battery.

During preparation of the layered porous film in this embodiment of this application, a polymer coating material, an adhesive, a wetting agent, and water are mixed and dispersed to form a supernatant solution, and the supernatant solution is applied onto a surface of a substrate film through roll-coating, followed by drying and winding to obtain the layered porous film in this embodiment of this application.

The following provides specific explanation description of the layered porous film in this application based on specific examples and comparative examples.

Table 1 lists structural and material parameters of the layered porous film provided in examples 1 to 9 and comparative examples 1 and 2.

TABLE 1

| No. | Component of substrate film and mass percentage of such component (melting point, weight-average molecular weight) | Component of polymer coating and mass percentage of such component (melting point, weight-average molecular weight) | Number of layers of substrate film | Thickness of substrate film (μm) | Pore-closing temperature of substrate film (° C.) | Inflection resistance of substrate film (WΩ) | Single-side/two-side thickness of polymer coating (μm) |
|---|---|---|---|---|---|---|---|
| Example 1 | Linear low-density polyethylene:high-density polyethylene = 30:70 (131° C., 800000) | Linear low-density polyethylene (120° C., 70000) | 3 | 9 | 131.2 | 9.4 | Single side, 4 μm |
| Example 2 | Linear low-density polyethylene:high-density polyethylene = 30:70 (136° C., 600000) | Polyethylene wax (93° C., 1200) | 3 | 5 | 130.9 | 6.9 | Single side, 2 μm |
| Example 3 | High-density polyethylene:metallocene polyethylene = 20:80 (138° C., 140000) | Polyethylene wax (95° C., 1400) | 3 | 9 | 129.8 | 9.4 | Single side, 4 μm |
| Example 4 | Linear low-density polyethylene:metallocene polyethylene = 60:40 (129° C., 400000) | Polyethylene wax (117° C., 20000) | 3 | 9 | 129.5 | 11.2 | Single side, 10 μm |
| Example 5 | Linear low-density polyethylene (132° C., 600000) | Linear low-density polyethylene:ethylene-acrylic acid copolymer = 95:5 (108° C., 57000) | 1 | 25 | 134.3 | 8.3 | Single side, 4 μm |
| Example 6 | Linear low-density polyethylene:high-density polyethylene = 50:50 (133° C., 450000) | Polyethylene wax (115° C., 20000) | 3 | 9 | 131.2 | 9.3 | Two sides, 2 μm/side |
| Example 7 | Metallocene polyethylene:high-density polyethylene = 30:70 (137° C., 100000) | Polyethylene wax (90° C., 1000) | 3 | 12 | 131 | 8.4 | Single side, 4 μm |
| Example 8 | Medium-density polyethylene:linear low-density polyethylene = 70:30 (137.5° C., 750000) | Linear low-density polyethylene (110° C., 2000) | 3 | 9 | 139.1 | 7.6 | Single side, 4 μm |
| Example 9 | Linear low-density polyethylene:high-density polyethylene = 60:40 (131.5° C., 550000) | Linear low-density polyethylene (115° C., 150000) | 3 | 9 | 131.3 | 9.4 | Single side, 4 μm |
| Comparative example 1 | Polypropylene (163° C., 300000) | Polyethylene wax (95° C., 1000) | 1 | 16 | 159 | 3.4 | Single side, 4 μm |
| Comparative example 2 | Linear low-density polyethylene:high-density polyethylene = 50:50 (133° C., 450000) | Polyvinylidene fluoride (160° C., 400000) | 3 | 9 | 133.3 | 4.5 | Single side, 4 μm |

The values in the "Single-side/two-side thickness of polymer coating (μm)" column in Table 1 indicate whether the polymer coating is applied on one side or two sides. For example, in example 1, "Single side, 4 μm" means that the polymer coating is applied only on one side of the substrate film, with a thickness of 4 μm; and "Two sides, 2 μm/side" in the example 6 means that the polymer coating is applied on two sides of the substrate film, with a thickness of 2 μm on each side.

Test I: Test for Layered Porous Film

Various performance parameters of the layered porous film in different examples and comparative examples were tested. The test results are listed in Table 2. The tested performance parameters included thickness of each film layer, melting point, weight-average molecular weight, pore-closing temperature, and inflection resistance.

The test methods for each performance parameter were as follows.

1. Test Method for Weight-Average Molecular Weight of Polymer

The weight-average molecular weight of the polymer was measured using a Malvern gel permeation chromatography system (model HT-GPC). A detector, sample cell, and chromatographic column were all set to a temperature of 150° C. 5 mg of a polymer under test was dissolved in 40 ml of 1,2,4-trichlorobenzene mobile phase. After complete dissolution of the polymer, the mobile phase was pumped into the chromatographic column, and after the injection, the sample was filtered with a self-cleaning filter and then flowed into the chromatographic column. After elution from the chromatographic column, the dissolved polymer molecules were separated according to their sizes and entered a light scattering and RI detector. The light scattering detection was used to determine an absolute molecular weight of the sample.

2. Test Method for Thickness

Thickness of a sample was measured at 10 to 15 points using a "LITEMATIC" VL-50 micrometer (with a test accuracy of 0.01 N). An average value was taken as the total thickness of the sample. The thickness of each layer was measured using the same method after layers of the separator were separated using the method for measuring interlayer peel force.

3. Method for Interlayer Peeling of Layered Porous Film

A layered porous film sample with a length of 100 mm and a width of 20 mm was cut. A piece of double-sided tape was cut for adhering and fixing a first surface of the layered porous film on a platform; then a piece of double-sided tape with a thickness of 50 μm was cut for fixing an end of the layered porous film on the platform to prevent movement of this end during peeling; and then another piece of double-sided tape with a thickness of 50 μm was cut and applied onto a second surface of the separator, and adhesive force of the tape was utilized for 180° peeling to separate the layers of the layered porous film.

4. Test Method for Melting Point

A simultaneous thermal analyzer (model STA449F3) was used to heat a sample from room temperature of 25° C. to 300° C. at a rate of 10° C./minute, and a first melting peak T1 of the sample was measured. Then, the sample was rapidly cooled back to room temperature and heated again from room temperature to 300° C. at a rate of 10° C./minute, and a second melting peak T2 of the sample was measured. T2 was recorded as the melting point of the sample.

5. Test Method for Pore-Closing Temperature

A separator sample with a length of 30 mm and a width of 30 mm was cut and sealed in a metal container connected with a positive electrode and a negative electrode, then the container was filled with a test electrolyte (A_E5068) and sealed, and then the metal container was connected to a resistance meter (TH2830 LCR Meter). The metal container was placed into an oven of 200° C., and a change in sample resistance inside the metal container with temperature was recorded. The temperature at which the sample resistance increased to 1000 ohms was recorded as the pore-closing temperature.

6. Test Method for Inflection Resistance

A separator sample with a length of 30 mm and a width of 30 mm was cut and sealed in a metal container connected with a positive electrode and a negative electrode, then the container was filled with a test electrolyte (A_E5068) and sealed, and then the metal container was connected to a resistance meter (TH2830 LCR Meter). The metal container was placed into an oven with a maximum measurement temperature of 200° C., and a change in sample resistance inside the metal container with temperature was recorded. The resistance corresponding to the inflection point that appears after the rapid increase in separator resistance to the peak value, that is, the point at which the slope of the resistance curve with temperature changes from high to low, was referred to as the inflection resistance.

Figure 3:
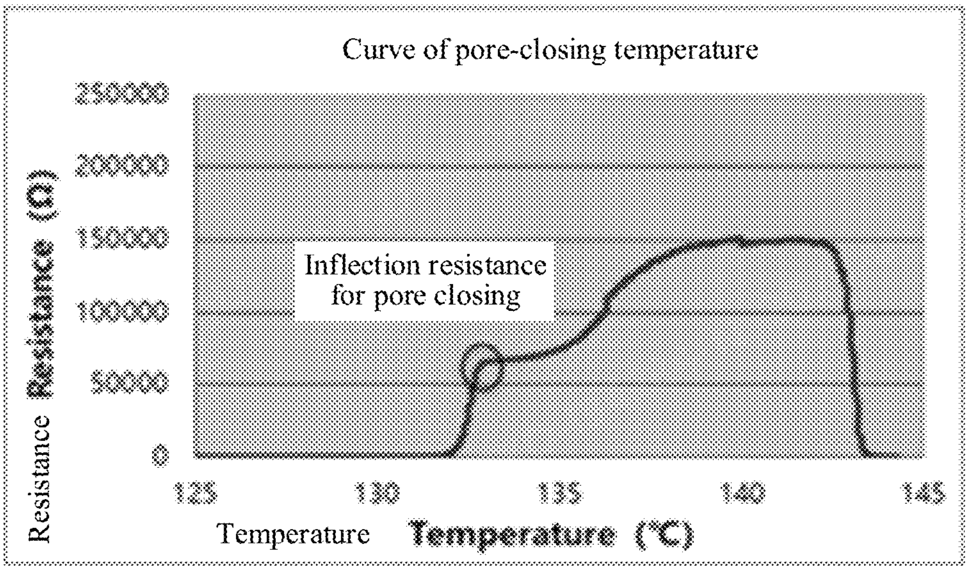
FIG. 3 is a curve of inflection resistance of a separator according to this application.

FIG. 3 shows a curve of inflection resistance of a separator according to this application. The inflection resistance of other separator samples was tested in the same way.

TABLE 2

| No. | Pore-closing temperature of layered porous film (° C.) | Inflection resistance of layered porous film (WΩ) |
|---|---|---|
| Example 1 | 129.4 | 9.3 |
| Example 2 | 129.2 | 7.1 |
| Example 3 | 127.3 | 9.4 |
| Example 4 | 125.7 | 11.3 |
| Example 5 | 133 | 8.1 |

TABLE 2-continued

| No. | Pore-closing temperature of layered porous film (° C.) | Inflection resistance of layered porous film (WΩ) |
|---|---|---|
| Example 6 | 128.2 | 9.4 |
| Example 7 | 128.5 | 8.2 |
| Example 8 | 138.9 | 7.6 |
| Example 9 | 131.2 | 9.3 |
| Comparative example 1 | 156 | 3.5 |
| Comparative example 2 | 133.9 | 4.2 |

It can be seen from the data in Table 2 that, when the melting points and inflection resistances of the substrate film and polymer coating satisfy the ranges defined in some embodiments of this application, the pore-closing temperature of the layered porous film can be effectively reduced. The pore-closing temperature of the layered porous film in some embodiments of this application can be lowered to 130° C. or less, and in some cases, even as low as 125° C. In addition, the inflection resistances of the layered porous films in some embodiments of this application all can reach 7.1 MΩ or more, with the inflection resistance of some layered porous films reaching 11 MΩ or more. In contrast, the layered porous films in comparative examples 1 and 2 cannot satisfy both the requirements for low pore-closing temperature and high inflection resistance. Even though comparative example 2 features low pore-closing temperature, it is difficult to achieve high inflection resistance, making it difficult to effectively improve safety performance. It can be seen from the related test data in examples 1 to 9 and comparative examples 1 and 2 that the layered porous film in some embodiments of this application exhibits characteristics of both low pore-closing temperature and high inflection resistance.

Test II: Battery Test

Test for Battery Pass Rate

The layered porous films provided in the examples and comparative examples were used as separators for assembling lithium-ion batteries, and pass rates of the batteries under overcharging conditions were tested. The test results are listed in Table 3. The assembled lithium-ion batteries had the same materials and assembly methods except for different separators.

Test method for pass rate was as follows: 100 lithium-ion battery samples were taken, discharged at a constant current of 0.25C to a rated voltage of 2.8 V at room temperature, and then charged at a rated current of 2C to a specified voltage of m V (m=4.8, 5.5, 6, or the like) and maintained at that voltage for 7 h. If the lithium-ion battery did not experience smoke, fire, and explosion, it was considered to have passed the test; otherwise, it was considered to have failed the test. The pass rate at 4.8 V refers to a ratio of the number of lithium-ion batteries that have passed the test at a voltage of 4.8 V to the total number of lithium-ion batteries. The same method was used for calculating the pass rates at other voltages.

TABLE 3

| No. | 4.8 V | 5.5 V | 6 V | 8 V | 10 V | 12 V |
|---|---|---|---|---|---|---|
| Example 1 | 100% | 100% | 100% | 100% | 100% | 0% |
| Example 2 | 100% | 100% | 100% | 100% | 70% | 0% |
| Example 3 | 100% | 100% | 100% | 100% | 100% | 50% |
| Example 4 | 100% | 100% | 100% | 100% | 100% | 100% |
| Example 5 | 100% | 100% | 100% | 100% | 100% | 0% |
| Example 6 | 100% | 100% | 100% | 100% | 100% | 30% |

TABLE 3-continued

| No. | 4.8 V | 5.5 V | 6 V | 8 V | 10 V | 12 V |
|---|---|---|---|---|---|---|
| Example 7 | 100% | 100% | 100% | 100% | 100% | 10% |
| Example 8 | 100% | 100% | 100% | 100% | 70% | 0% |
| Example 9 | 100% | 100% | 100% | 80% | 0% | 0% |
| Comparative example 1 | 0% | 0% | 0% | 0% | 0% | 0% |
| Comparative example 2 | 100% | 100% | 100% | 0% | 0% | 0% |

It can be seen from the data in Table 3 that for the lithium-ion batteries manufactured using the layered porous films provided in examples 1 to 9 of this application as separators, the pass rates of them at voltages ranging from 4.8 V to 6 V are all 100%, and the pass rates at 8 V are also all 80% or more, with some even reaching 100%. In addition, at the voltage of 12 V, the pass rates of the lithium-ion batteries corresponding to examples 3 and 4 reach 50% and 100% respectively. In contrast, for the lithium-ion batteries using the layered porous films provided in comparative examples 1 and 2 as separators, the pass rates at 8 V are both 0. Therefore, the layered porous film in some embodiments of this application exhibits better safety.

Although this application is disclosed above with preferred embodiments, they are not intended to limit the claims. Any person skilled in the art can make several possible changes and modifications without departing from the concept of this application. Therefore, the protection scope of this application shall be subject to the scope defined by the claims of this application.

What is claimed is:

1. A layered porous film, comprising a substrate film and a polymer coating provided on at least one side of the substrate film, wherein the substrate film and the polymer coating satisfy both formula I and formula II:

formula I $$0 \le (Tm_1 - Tm_2)/M_1 \le 0.0005, \text{ and}$$

formula II $$0 \le (Tm_1 - Tm_2)/M_2 \le 0.05;$$

wherein $Tm_1$° C. is a melting point of the substrate film and satisfies 125° C.≤$Tm_1$≤140° C., and $M_1$ is a weight-average molecular weight of a polymer contained in the substrate film; and $Tm_2$° C. is a melting point of the polymer coating, and $M_2$ is a weight-average molecular weight of a polymer contained in the polymer coating.

2. The layered porous film according to claim 1, wherein the melting point $Tm_2$ of the polymer coating satisfies 90° C.≤$Tm_2$≤$Tm_1$.

3. The layered porous film according to claim 1, wherein 100000≤$M_1$≤1000000.

4. The layered porous film according to claim 1, wherein 1000<$M_2$<100000.

5. The layered porous film according to claim 1, wherein, at least one of the following characteristics is satisfied:

a thickness of the layered porous film is 5 μm to 30 μm; or a thickness of the polymer coating accounts for 3%-67% of the thickness of the layered porous film.

6. The layered porous film according to claim 1, wherein, at least one of the following characteristics is satisfied:

a pore-closing temperature of the substrate film is less than or equal to 135° C.; or an inflection resistance of the layered porous film is greater than or equal to 5 WΩ.

7. The layered porous film according to claim 1, wherein a material of the substrate film comprises at least one of ultra-high molecular weight polyethylene, polypropylene, high-density polyethylene, medium-density polyethylene, low-density polyethylene, linear low-density polyethylene, linear and branched polyethylene, metallocene polyethylene, polyimide, poly(4-methyl-1-pentene), polystyrene, or polyvinylidene fluoride.

8. The layered porous film according to claim 1, wherein a material of the polymer coating comprises at least one of linear and branched polyethylene, polyethylene wax, polymethyl methacrylate, ethylene-acrylic acid copolymer, or ethylene-vinyl acetate copolymer.

9. A secondary battery, comprising a positive electrode, a negative electrode, and a layered porous film, the layered porous film comprising a substrate film and a polymer coating provided on at least one side of the substrate film, wherein the substrate film and the polymer coating satisfy both formula I and formula II:

formula I $$0 \le (Tm_1 - Tm_2)/M_1 \le 0.0005, \text{ and}$$

formula II $$0 \le (Tm_1 - Tm_2)/M_2 \le 0.05;$$

wherein $Tm_1$° C. is a melting point of the substrate film and satisfies 125° C.≤$Tm_1$≤140° C., and $M_1$ is a weight-average molecular weight of a polymer contained in the substrate film; and $Tm_2$° C. is a melting point of the polymer coating, and $M_2$ is a weight-average molecular weight of a polymer contained in the polymer coating.

10. The secondary battery according to claim 9, the melting point $Tm_2$ of the polymer coating satisfies 90° C.≤$Tm_2$≤$Tm_1$.

11. The secondary battery according to claim 9, wherein 100000≤$M_1$≤1000000.

12. The secondary battery according to claim 9, wherein 1000<$M_2$<100000.

13. The secondary battery according to claim 9, wherein, at least one of the following characteristics is satisfied:

a thickness of the layered porous film is 5 μm to 30 μm; or a thickness of the polymer coating accounts for 3%-67% of the thickness of the layered porous film.

14. The secondary battery according to claim 9, wherein, at least one of the following characteristics is satisfied:

a pore-closing temperature of the substrate film is less than or equal to 135° C.; or an inflection resistance of the layered porous film is greater than or equal to 5 WΩ.

15. The secondary battery according to claim 9, wherein a material of the substrate film comprises at least one of ultra-high molecular weight polyethylene, polypropylene, high-density polyethylene, medium-density polyethylene, low-density polyethylene, linear low-density polyethylene, linear and branched polyethylene, metallocene polyethylene, polyimide, poly(4-methyl-1-pentene), polystyrene, or polyvinylidene fluoride.

16. The secondary battery according to claim 9, wherein a material of the polymer coating comprises at least one of linear and branched polyethylene, polyethylene wax, polymethyl methacrylate, ethylene-acrylic acid copolymer, or ethylene-vinyl acetate copolymer.

17. An electronic apparatus, comprising a secondary battery, the secondary battery comprises a positive electrode, a negative electrode, and a layered porous film; the layered porous film comprising a substrate film and a polymer coating provided on at least one side of the substrate film, wherein the substrate film and the polymer coating satisfy both formula I and formula II:

$$0 \le (Tm_1 - Tm_2)/M_1 \le 0.0005, \quad \text{and} \qquad \text{formula I}$$

$$0 \le (Tm_1 - Tm_2)/M_2 \le 0.05; \qquad \text{formula II}$$

wherein $Tm_1$° C. is a melting point of the substrate film and satisfies 125° C.≤$Tm_1$≤140° C. and $M_1$ is a weight-average molecular weight of a polymer contained in the substrate film; and $Tm_2$° C. is a melting point of the polymer coating, and $M_2$ is a weight-average molecular weight of a polymer contained in the polymer coating.

18. The layered porous film according to claim 1, wherein, the following characteristics are satisfied:

a thickness of the layered porous film is 5 μm to 30 μm; and a thickness of the polymer coating accounts for 3%-67% of the thickness of the layered porous film.

19. The secondary battery according to claim 9, wherein, the following characteristics are satisfied:

a thickness of the layered porous film is 5 μm to 30 μm; and a thickness of the polymer coating accounts for 3%-67% of the thickness of the layered porous film.

20. The electronic apparatus according to claim 17, wherein, the following characteristics are satisfied:

a thickness of the layered porous film is 5 μm to 30 μm; and a thickness of the polymer coating accounts for 3%-67% of the thickness of the layered porous film.

* * * * *